(12) United States Patent
Mukasyan et al.

(10) Patent No.: US 9,580,323 B2
(45) Date of Patent: Feb. 28, 2017

(54) METHOD OF PRODUCING GRAPHENE AND OTHER CARBON MATERIALS

(71) Applicants: Alexander Mukasyan, Granger, IN (US); Khachatur Manukyan, Mishawaka, IN (US)

(72) Inventors: Alexander Mukasyan, Granger, IN (US); Khachatur Manukyan, Mishawaka, IN (US)

(73) Assignee: University of Notre Dame Du Lac, South Bend, IN (US)

( * ) Notice: Subject to any disclaimer, the term of this patent is extended or adjusted under 35 U.S.C. 154(b) by 57 days.

(21) Appl. No.: 14/292,576

(22) Filed: May 30, 2014

(65) Prior Publication Data

US 2014/0377160 A1  Dec. 25, 2014

Related U.S. Application Data

(60) Provisional application No. 61/829,423, filed on May 31, 2013.

(51) Int. Cl.
 C01B 31/04 (2006.01)
 C01B 31/02 (2006.01)
(52) U.S. Cl.
 CPC .......... C01B 31/0446 (2013.01); C01B 31/02 (2013.01)
(58) Field of Classification Search
 CPC ............................ C01B 31/02; C01B 31/0446
 USPC ......................................................... 423/448
 See application file for complete search history.

(56) References Cited

U.S. PATENT DOCUMENTS 8,227,685 B2  7/2012  Choi

OTHER PUBLICATIONS

Huczko, et al., Synthesis of Novel Nanostructures by Metal-Polytetrafluoroethene Thermolysis, J. Phys. Chem. B 2003; 107: 2519-2524.*
Presser, et al., Carbide-Derived Carbons—From Porous Networks to Nanotubes and Graphene, Adv. Funct. Mater. 2011; 21: 810-833.*
Li, et al., X-ray diffraction patterns of graphite and turbostradic carbon, Carbon 2007; 45: 1686-1695.*
USPTO Memorandum dated Jan. 24, 2007, "Clarification of Second Action Final Rejection Practice with Respect to Claims Drafted Using Alternative Language".*
Geng, D. et al., "Uniform Hexagonal Graphene Flakes and Films Grown on Liquid Copper Surface," PNAS 109 (21):7992-7996 (2012).

(Continued)

*Primary Examiner* — Daniel C McCracken
(74) *Attorney, Agent, or Firm* — Haukaas Fortius PPLC; Michael H. Haukaas

(57) ABSTRACT

The invention provides methods for the combustion synthesis (CS) of graphene by a novel exothermic self-sustained reaction between a refractory ceramic compound and a carbon-containing polymer under an inert gas atmosphere. The synthesis of graphene was confirmed by both transmission electron microscopy and Raman spectroscopy. The graphene produced has very low (<1 wt. %) oxygen content. Fluorocarbon gases released due to decomposition of the carbon-containing polymer in the combustion wave can reduce the ceramic to a gas and mesoporous carbon particles and graphene layers. The method does not require an external energy source because it occurs in a self-sustained synergetic manner after ignition. The methods are flexible in terms of tuning the synthesis conditions for desired products, and the method can be scaled to provide kilogram quantities.

20 Claims, 11 Drawing Sheets

(56) References Cited

OTHER PUBLICATIONS

Liao, K. et al., "Aqueous Only Route Toward Graphene From Graphite Oxide," ACS NANO 5(2):1253-1258 (2011).
Manukyan, K. et al., "Combustion Synthesis of Graphene Materials," Carbon 62:302-311 (2013).
Stankovich, S. et al., "Synthesis of Graphene-Based Nanosheets Via Chemical Reduction of Exfoliated Graphite Oxide," Carbon 45:1588-1565 (2007).
Yang, D. et al., "Chemical Analysis of Graphene Oxide Films After Heat and Chemical Treatments by X-ray Photoelectron and Micro-Raman Spectroscopy," Carbon 47:145-152 (2009).

\* cited by examiner

METHOD OF PRODUCING GRAPHENE AND OTHER CARBON MATERIALS

RELATED APPLICATIONS

This application claims priority under 35 U.S.C. §119(e) to U.S. Provisional Patent Application No. 61/829,423, filed May 31, 2013, which is incorporated herein by reference.

BACKGROUND OF THE INVENTION

Graphene, atomically thin carbon sheets, and its structural derivatives (bi- or few-layered graphene) have attracted great attention due to their exceptional charge transport, thermal, optical and mechanical properties. Graphene materials have been evaluated for applications in electronics, energy conversion and storage technologies, gas sensing technology, and in many other fields.

As a single sheet, graphene was first isolated by micromechanical cleaving of graphite by an adhesive substrate. Another method to produce graphene is epitaxial growth on a copper or nickel substrate from a diluted hydrocarbon atmosphere at ~1300 K. After a chemical etching of the metal substrate, the graphene layers can be detached and transferred to another substrate. An approach to producing few-layered graphene is ultrahigh vacuum annealing of a silicon carbide (SiC) wafer. This method requires no transfer before use in processing devices, which makes it attractive for the semiconductor industry.

The reaction between halogens (e.g., chlorine) and refractory carbides (e.g., SiC, TiC, WC, $Ti_3SiC_2$) at temperatures of 900-1500 K are also known to produce various carbon materials. In this process, the chlorine selectively etches the metal (Ti, W) or metalloid (Si) from the carbide lattice resulting in disordered porous carbons, which are often referred to as carbide-derived carbons (CDCs). Chlorination of some carbides results in CDC particles with surface graphene layers.

Oxidative exfoliation of graphite and subsequent chemical reduction is one of the most efficient methods for low-cost production of graphene. However, the chemical reduction cannot remove many irreversible lattice defects introduced by the oxidation process. These defects degrade the electronic properties of graphene. Nano-sheets obtained by this chemical modification strategy also suffer from relatively low surface area and readily form aggregated structures, which greatly impact their application performance. Therefore, it is important to search for new effective approaches for synthesis of graphene nano-sheets with desired properties.

Recently, several attempts have been made to produce a variety of advanced carbon-based nano-structures, including graphene, by self-sustaining combustion reactions. For example, porous disordered carbon "onions" were produced by exothermic reaction between sodium azide ($NaN_3$) and in hexachlorobenzene ($C_6Cl_6$) or hexachloroethane ($C_2Cl_6$). A different approach based on self-sustained direct reduction of $CO_2$ and $CO$ gases by metals (Li, Mg, Ca, B, Ti, Zr, and Al) is also proposed to produce layered graphite materials. Researchers have suggested that the Mg reduction of $CO_2$ is the most optimal system to produce few-layered graphene. It has also been demonstrated that short-term local heating of a graphene oxide (GO) sample may initiate a self-propagating deoxygenation reaction resulting in reduced-GO.

However, each of the methods currently used for preparing carbon-based nano-structures are limited in terms of scalability or their resulting purity. Accordingly, new methods of synthesizing carbon-based nano-structures are needed to advance the fields of electronics, energy conversion and storage technologies, gas sensing technology, and coatings. Preferably the methods would be cost-effective relative to current technologies and scalable for kilogram syntheses of carbon-based nano-structures such as graphene.

SUMMARY

The invention provides methods for preparing graphene without a furnace and without harsh chemical solutions. The methods include using a solid phase reaction to reach temperatures of ~1800 K to produce graphene flakes. The reaction is self-propagating and thus requires only a small amount of energy for ignition. The process is conducted in a reaction chamber sealed with an inert gas environment. The process results in single or bi-layer graphene as well as other carbonous morphologies.

Accordingly, the invention provides a method comprising initiating a combustion synthesis reaction between a refractory ceramic compound and a halogen-containing carbon substrate. The reaction is carried out under a substantially oxygen-free inert atmosphere, for example, at about 0.25 MPa to about 20 MPa. After ignition the reaction is exothermic and self-propagating, and results in the formation of reduced carbon materials. The reduced carbon materials can include graphene, carbon mesoporous particles, thin-walled carbon spheres, and combinations thereof.

In one embodiment, the refractory ceramic compound is a carbide, boride, silicide, nitride, or hydride. In various embodiments, the refractory ceramic compound is SiC, $Si_3N_4$, AlN, $B_4C$, $Mo_2C$, $MoSi_2$, TiC, TiN, $TiB_2$, $TiH_2$, $TiSi_2$, $Ti_5Si_3$, $Ti_3SiC_2$, TaC, TaN, $TaB_2$, WC, $WSi_2$, ZrC, ZrN, $ZrB_2$, $ZrH_2$, or a combination thereof.

In some embodiments, the halogen-containing carbon substrate is a halogenated carbon polymer. In certain specific embodiments, the halogenated carbon polymer comprises polytetrafluoroethylene (PTFE), polyvinyl chloride (PVC), polyvinyl fluoride (PVF), polyethylenechlorotrifluoroethylene, poly(vinylidene fluoride), polytetrafluoroethylene, polyvinyl chloride, polyvinyl fluoride, polyethylenechlorotrifluoro-ethylene, or poly(vinylidene fluoride), poly(vinylidene chloride), fluorinated ethylene propylene, poly(4-bromostyrene), poly(4-chlorostyrene), poly(2-chloro-1,3-butadiene), brominated polystyrene, chlorinated polystyrene, or poly(tetrafluoroethylene propylene). In one specific embodiment, the halogen-containing carbon substrate is polytetrafluoroethylene (PTFE) (i.e., TEFLON powder).

In some embodiments, the refractory ceramic compound and the halogen-containing carbon substrate are in the form of micronized powders that are mixed together to form a reactive mixture. The ceramic compound can be formed into a power, for example, a powder having particles of less than about 100 μm in diameter, or less than about 50 μm in diameter. The halogen-containing carbon substrate can also be micronized to provide a powder having particles of less than about 100 μm in diameter, or less than about 50 μm in diameter. Smaller particle sizes in the reactive mixture can facilitate a higher ratio of graphene sheet products. Accordingly, the halogen-containing carbon substrate can be particles of less than about 10 μm in diameter, for example, about 1-10 μm, or about 3-5 μm in diameter.

The products of the reaction can have significantly increase surface area (SA) compared to the reactants, typically at least about 5×, at least about 10×, or at least about 20× the SA of the micronized starting material powders. When the combustion synthesis reaction is modulated by a water soluble salt (e.g., sodium chloride), the reaction temperature is reduced and significantly higher SA can be obtained, along the lines of 400-500 m$^2$/g, or about 430 m$^2$/g (e.g., a SA increase of at least about 400× or at least about 500×).

The reduced carbon materials formed by the method can include mesoporous carbon nanoparticles with folded native graphene layers on the surfaces of the mesoporous carbon nanoparticles. The reduced carbon materials formed by the method can also be carbon (graphene) sheets or thin-walled carbon spheres. The graphene sheets can be about 1 µm to about 10 µm in width, about 1 µm to about 10 µm in length, and about 1 to about 10 Angstroms thick, typically about 1 to about 3 Angstroms thick.

The ratio of the refractory ceramic compound and the halogen-containing carbon substrate can be any suitable and effective ratio, for example, about 1:10 to about 10:1. However, for complete conversion of the reactive mixture starting materials and higher graphene production, a ratio of about 1:1 to about 1:3, or about 1:2, is preferred.

The carbonous products of the reaction produced have extremely low oxygen content. In one embodiment, the reduced carbon materials comprise less than 1 wt. % of oxygen. In some embodiments, the reduced carbon materials comprise less than 0.8 wt. % of oxygen. In various embodiments, the reduced carbon materials comprise less than 0.4 wt. % of oxygen.

The invention further provides a method comprising initiating a combustion synthesis reaction between silicon carbide (SiC) and polytetrafluoroethylene (PTFE) under a substantially oxygen-free inert atmosphere. The pressure of the inert atmosphere can be about 0.25 MPa to about 20 MPa. Higher pressures can be used but are typically unnecessary for the reactions described herein. After ignition the reaction is exothermic and self-propagating, and the reaction results in the formation of reduced carbon materials. The reduced carbon materials can include graphene, carbon mesoporous particles, thin-walled carbon spheres, or a combination thereof.

In one embodiment, the silicon carbide (SiC) and polytetrafluoroethylene (PTFE) are in the form of micronized powders that are mixed together to form a reactive mixture. The reaction mixture can further include a water-soluble salt that modulates (e.g., reduces) the temperature of the self-propagating reaction to provide a higher amount of graphene sheets as products compared to a reaction carried out without the salt.

The ratio of SiC to PTFE can be as described above, for example, about 1:1 to about 1:3. In one embodiment, the reduced carbon materials formed in the reaction comprise graphene sheets. In various embodiments, the graphene sheets comprise less than about 0.4 wt. % oxygen.

The reduced carbon materials can be hybrid structures of highly porous carbon with well-crystallized graphene sheets. The graphene sheets can be at least about 1 wt. %, at least about 5 wt. %, at least about 10 wt. %, at least about 20 wt. %, at least about 25 wt. %, at least about 30 wt. %, or at least about 35 wt. % of the reduced carbon material products. In the reaction of silicon carbide with PTFE, the reduced carbon material products can include up to about 37 wt. % or up to about 40 wt. % graphene, which can be separated from the highly porous carbon, for example, by methods described herein. The graphene can be primarily (at least about 50 wt. %) single-layer and bi-layer sheets.

In further embodiments, the methods can include isolating graphene from other carbon structures produced in the combustion synthesis reaction to provide an isolated graphene powder. The reduced carbon materials can be used to prepare electronic devices including thin film transistors, storage devices, gas sensing devices, or coatings.

The invention yet further provides novel carbonous products as described herein, for example, having less than about 1 wt. % oxygen content and high surface area.

The invention thus provides novel carbon structures, as well as methods of preparing graphene and various carbon-based structures. The invention also provides carbon structures and graphene powders that are useful as intermediates for the synthesis of useful compositions and devices, such as electronic devices and transistors, energy conversion and storage devices, gas sensing devices, and coatings.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
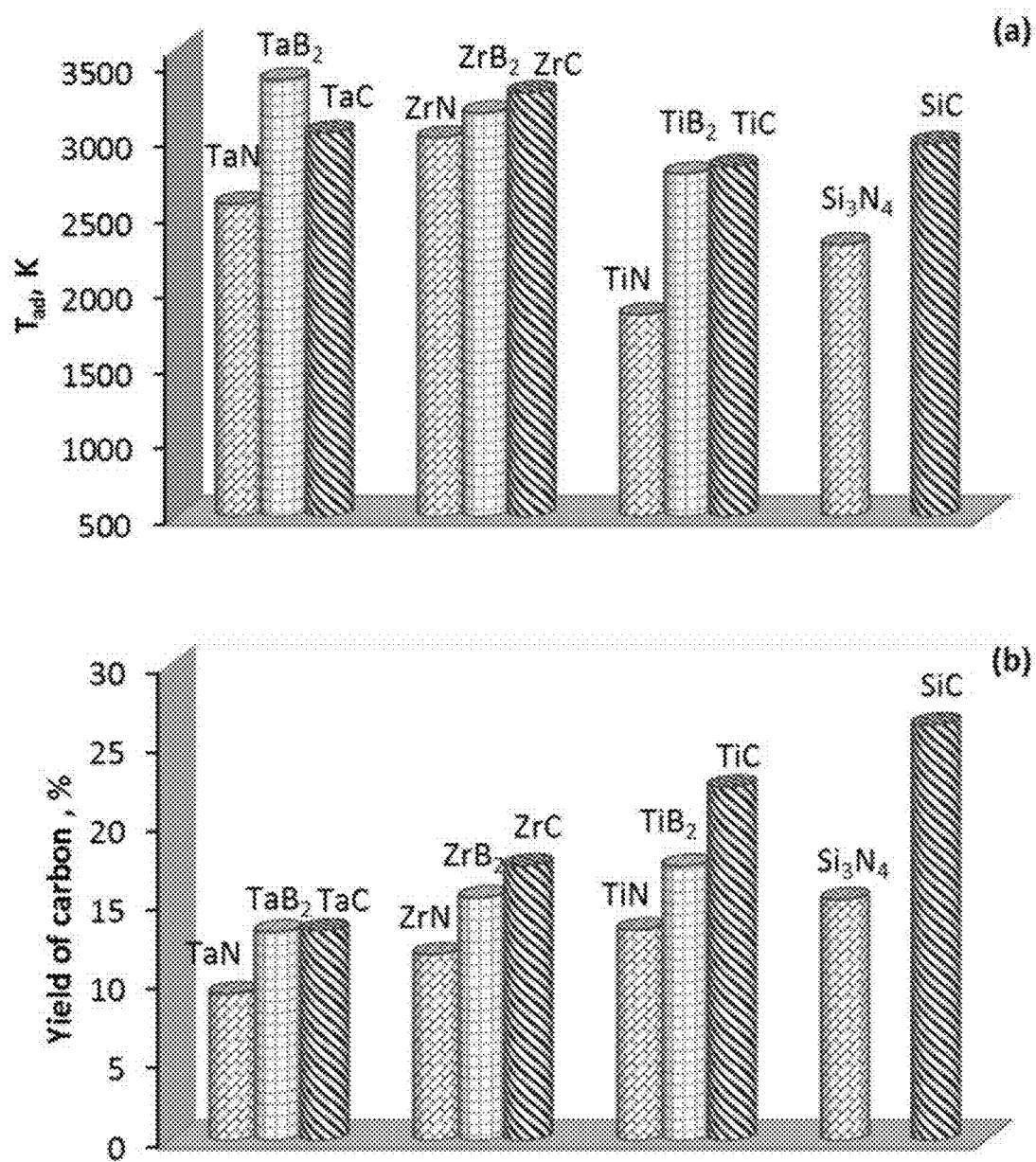
FIG. 1. Calculated (a) adiabatic temperatures and (b) yields of carbon, for reactions of different ceramic compounds with PTFE.

The invention provides methods of manufacturing graphene and graphene composites by locally preheating at least a portion of a homogeneous reactant mixture comprising refractory ceramic compounds and halogen polymers contained in a reaction chamber filled with an inert gas under pressure (e.g., of about 0.25 to about 5 MPa) to a temperature sufficient to initiate an exothermic self-propagating reaction. An effective combinations of reactants enables the self-propagating reaction to proceed at about 800-1000 K. This approach allows for the production of single-layer and bi-layer graphene sheets, graphene-amorphous carbon composites, and microporous carbon particles.

Accordingly, combustion synthesis (CS) of graphene by a novel exothermic self-sustained reaction between refractory ceramic compounds (e.g., silicon carbide) and polymers (e.g., polytetrafluoroethylene, PTFE) under an inert gas (e.g., argon) environment is described herein. The synthesis of graphene was confirmed by both transmission electron microscopy and Raman spectroscopy. The graphene produced has very low (<1 wt. %) oxygen content. Fluorocarbon gases (e.g., tetrafluoroethylene) released due to PTFE decomposition in the combustion wave can reduce ceramics such as SiC to produce tetrafluorosilane ($SiF_4$) gas and mesoporous carbon particles with folded "native" graphene layers on their surfaces. The continuous supply of carbon, in the form of halocarbon gases, and the high reaction temperature (e.g., up to about 1400 K), enables further rapid growth of "free-standing" graphene sheets on the surface of the graphene-coated particles. The method developed for the synthesis of graphene does not require an external energy source because it occurs in a self-sustained synergetic manner after ignition. The methods are flexible in terms of tuning the synthesis conditions for desired products, and allows for easy scale-up to provide kilogram quantities.

Self-sustained exothermic reactions have thus been discovered to be effective methods for the synthesis of variety of carbon-based nano-structures. We herein describe a novel pathway for the synthesis of carbon nano-materials, including graphene, by using combustion-type reactions between different ceramics (carbides, nitrides, etc.) and polytetrafluoroethylene (PTFE). The method combines the concepts of using halogens to reduce refractory compounds, e.g. carbides, and combustion synthesis approaches.

The invention therefore provides a direct combustion-based method for synthesis of graphene, graphene composites, and microporous carbon materials with high specific surface areas. Refractory inorganic carbides, borides, silicides, nitrides, and hydrides can be used to react exothermically with carbon sources such as halogenated polymers or halogenated organic compounds (e.g., halogenated alkanes and aryls, typically having about –12, about 1-6, or about 6 carbons). Preferably the molecular weight of the polymer results in a compound that can be used as a solid particle when preparing the reactive mixture of the synthesis combustion reaction. Suitable polymer molecular weights can be about 5 kDa to about 600 kDa.

Suitable halogenated polymers (HPolym) can include, but are not limited to, polytetrafluoroethylene, polyvinyl chloride, polyvinyl fluoride, polyethylenechlorotrifluoro-ethylene, or poly(vinylidene fluoride), poly(vinylidene chloride), fluorinated ethylene propylene, poly(4-bromostyrene), poly (4-chlorostyrene), poly(2-chloro-1,3-butadiene), brominated polystyrene, chlorinated polystyrene, or poly(tetrafluoroethylene propylene). Suitable halogenated organic compounds that can be used in the combustion synthesis reactions can include, but are not limited to, hexachlorobenzene, pentachlorobenzene, tetrachlorobenzene, trichlorobenezene, dichlorobenezene, hexabromobenzene, pentabromobenzene, tetrabromobenzene, tribromobenzene, dibromobenzene, their congeners, and similar halogenated compounds. Suitable halogenated organic compounds can be solids or liquids at room temperature (~23° C.). The adiabatic combustion temperatures of the reactions can be in the range of about 1000 K to 4000 K, or about 1300 K to 3800 K.

The ceramic used in the reaction can be a carbide (e.g., a metal carbide or metalloid carbide: 'Me'C) such as SiC, $B_4C$, TiC, TaC, NbC, WC, $W_2C$, $Mo_2C$, $Cr_2C_3$, $Mo_2C$, $B_4C$, AlN, $MoSi_2$, $WSi_2$, $TiSi_2$, or $Ti_5Si_3$, $TiH_2$, $ZrH_2$, and the like. The products of the reactions are carbonaceous materials and volatile metal (or metalloid) halogenides (e.g., 'Me'Cl, F), the formation of which can be represented by the following reaction:

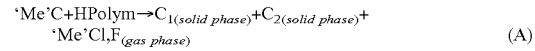

'Me'C+HPolym→$C_{1(solid\ phase)}$+$C_{2(solid\ phase)}$+
  'Me'Cl,F$_{(gas\ phase)}$     (A)

The halogen selectively "leaches" metal or metalloid atoms from carbides, forming one or two types of carbon from both procurers, i.e., $C_1$ from reducing of 'Me'C and $C_2$ from decomposition of the halogen polymer.

When the halogen polymers react with borides ('Me'B: $TiB_2$, MoB, $ZrB_2$, and the like) or silicides ('Me'Si: $MoSi_2$, TiSi, $Ti_5Si_3$, and the like), a carbon and gaseous halide phases are formed. The nitride ('Me'N: $Si_3N_4$, BN, TiN, AlN, and the like) containing systems form solid carbon, halogenide gases and molecular nitrogen. However, in boride, silicide and nitride-based systems, the polymer is the only source for carbon formation and all other elements are transformed to fluoride gases, as represented by the following reactions:

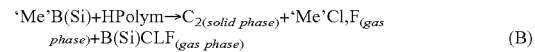

'Me'B(Si)+HPolym→$C_{2(solid\ phase)}$+'Me'Cl,F$_{(gas\ phase)}$+B(Si)CLF$_{(gas\ phase)}$     (B)

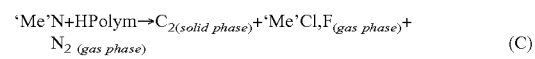

'Me'N+HPolym→$C_{2(solid\ phase)}$+'Me'Cl,F$_{(gas\ phase)}$+$N_{2\ (gas\ phase)}$     (C)

Experimental investigations showed that all the above-mentioned ceramic phases (carbides, borides, silicides and nitrides) can react with halogen polymers in a self-sustained manner. For example, if the powder mixture of any carbide mentioned above, and polytetrafluoroethylene mixed at an effective ratio of reagents, is locally preheated to approximately 500 K to about 800 K, then a reaction wave propagates through the whole sample volume (e.g., up to 1 m³) in self-sustained manner, i.e., without any sources of external energy, with formation of products according to reaction (A).

It was also experimentally demonstrated that this exothermic reaction provides a rapid reduction of carbide and simultaneously etches the metal (or metalloid) component of the ceramic or inorganic compound, followed by graphene sheet growth on the surface of microporous carbon particles. The synthesized composite particles contain several single-layer or bi-layer crystals of graphene sheets with sizes of up to 10 μm formed on the surface of amorphous carbon cores. The ratio between graphene sheets and amorphous particles may be adjusted by changing the process condition (e.g., toward graphene by increasing inert gas pressure) and particle sizes of precursors (e.g., reduction of particle size produces a higher ratio of graphene). The method also allows for the synthesis of microporous carbon particles with specific surface areas above 2000 $m^2/g$. Distinct features of method for graphene materials production include the formation of high quality product material; high yields of synthesized materials; up-scaling ability of the process; low overall energy consumption; and simple apparatus requirements.

Currently, the main method for production of graphene is the so-called reduction of "graphite oxide". In the graphite oxide method, liquid-phase oxidation of graphite is performing under strong oxidative conditions. Subsequent reduction of oxidized graphite by amines (such as toxic hydrazine) leads to graphene sheets. However, significant quantities of oxygen are still found after the amine reduction reactions (Yang et al., Carbon, 47, 145-152 (2009); Stankovich, et al., Carbon, 45, 1558-1565 (2007); Liao, ACS Nano, 51, 253-1258 (2011)). As a result, oxygen concentrations in these graphene sheets is typically ≥20 wt. %. The latter quality significantly hinders superior electrical, optical and mechanical properties of graphene.

In the methods of graphene and graphene composite synthesis described herein, oxygen content of the products is always less than 1 wt. %. Another advantage of the polymer-ceramic combustion method is its ability to produce composites of graphene sheets with microporous carbon particles. High surface area of porous carbon (~$10^3$ $m^2/g$) and tunable pore size distribution makes these composites ideal materials for anodes in rechargeable battery and supercapacitor applications.

The reactions of other ceramic compounds (borides, nitrides and silicides) with halogen polymers show lower graphene-forming ability. However, those reactions are characterized by very high combustion temperature (>3000 K) and extremely rapid combustion front propagation velocity (up to 1 m/s). These features coupled with large gasification renders these reacting mixture excellent candidates for propellant applications.

Two ceramic+polymer compositions, i.e. SiC+PTFE and TiN+PTFE, are described in detail. While both systems allow formation of two dimensional carbon nano-structures, only reduction of SiC in the combustion wave leads to the growth of free-standing graphene. Fluorocarbon gases (e.g., tetrafluoroethylene ($C_2F_4$)), released due to PTFE decomposition in the combustion wave, reduces SiC to tetrafluorosilane ($SiF_4$) gas and mesoporous carbon particles with folded "native" graphene layers on their surfaces. The continuous supply of carbon, in the form of fluorocarbon gases, and high reaction temperature (~1400 K) enables further rapid growth of "free-standing" graphene sheets on the surface of those graphene-coated particles.

Thermodynamic Analysis.

Thermodynamic analysis to calculate adiabatic combustion temperature ($T_{ad}$) and equilibrium composition of products for MeC+PTFE, MeN+PTFE and $MeB_2$+PTFE systems was performed as described in Example 1 below (MeC: TaC, ZrC, TiC, or SiC; MeN: TaN, ZrN, TiN, or $Si_3N_4$; $MeB_2$: $TaB_2$, $ZrB_2$, $TiB_2$). The calculated values of $T_{ad}$, corresponding to complete fluorination of 'Me' (metal), for all systems are summarized in FIG. 1a. All the systems have high adiabatic combustion temperatures in the range 1900-3500 K, which indicates that self-sustained combustion reactions can be accomplished for each of these compositions when combined with a suitable carbon source.

The calculations also show that all systems may produce elemental carbon as the only solid state product, when appropriate amount of PTFE is used. The theoretical yield of carbon (the ratio of the amount of carbon product to the amount of initial reactive mixture carbon) varies from system to system (FIG. 1b). The highest yield shows MeC+PTFE systems, since carbon forms both from PTFE and MeC sources. Fluoride gases ($TaF_5$, $ZrF_2$, $ZrF_4$, $TiF_3$, $SiF_2$, $SiF_4$ and $BF_3$) are the main by-products of reacting systems. In addition to fluoride, MeN+PTFE systems produce nitrogen.

The SiC+PTFE system produces graphene layers upon carbon particles. These layers can serve as nucleation sides for further growth of graphene nano-sheets. The SiC+PTFE system was therefore selected for the further detailed investigation. The TiN+PTFE reaction was also investigated, which provides the highest amount of carbon among nitride based systems, but, in contrast to the SiC+PTFE composition, with PTFE decomposition as the only source for carbon formation.

Figure 2:
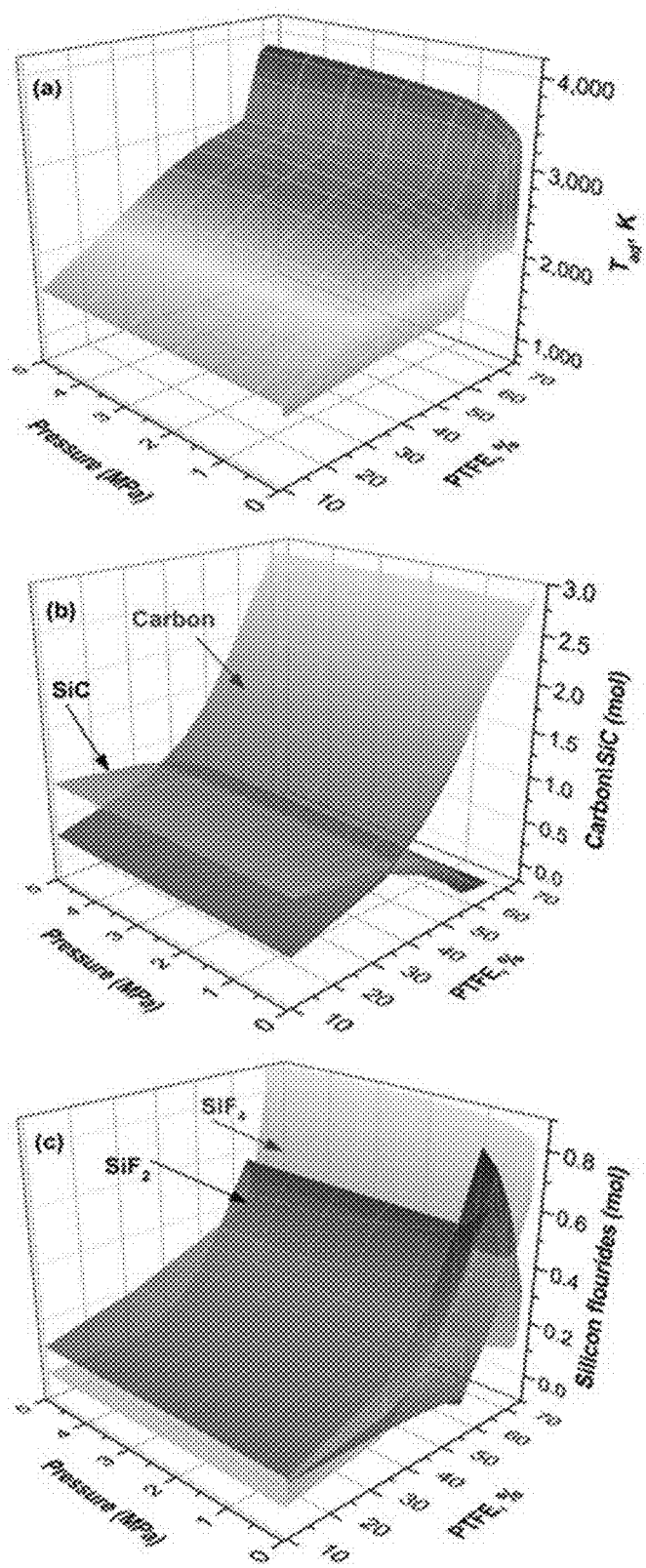
FIG. 2. (a) Adiabatic temperature, and (b, c) equilibrium composition of products, for SiC+PTFE system depending on PTFE quantity and inert gas pressure (b, carbon/SiC; c, PTFE).

To optimize combustion conditions in the SiC+PTFE system, further thermodynamic calculations of $T_{ad}$ and equilibrium products were performed as a function of PTFE content and the inert gas pressure in a batch reactor (FIG. 2). The $T_{ad}$ continuously increases up to ~3800 K with the increase of both parameters (PTFE content and pressure) (FIG. 2a). The quantity of SiC in product decreases gradually with increase of PTFE content. Meanwhile, carbon quantity rises, and it becomes the only solid product at ~65 wt. % of PTFE content in the initial mixture (FIG. 2b). The composition of gas products depends on both calculated parameters. Tetrafluorosilane ($SiF_4$) is the primary gas phase product at the optimal PTFE content (FIG. 2c).

Combustion Synthesis.

Figure 3:
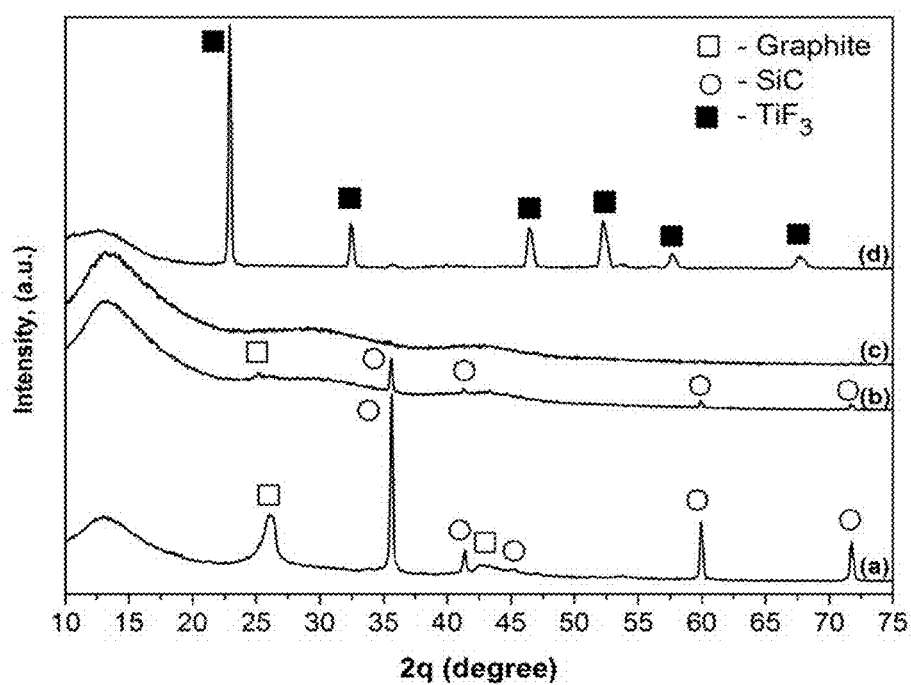
FIG. 3. Results of XRD analysis of combustion product for (a) 35% SiC+65% PTFE, (b) 24% SiC+46% PTFE+30% NaCl PTFE, (c) 17% SiC+33% PTFE+50% NaCl PTFE and (d) 45% TiN+55% PTFE mixtures.

Experiments performed with the 35% SiC+65% PTFE (wt. %) exothermic initial mixture confirmed that reaction can be initiated by a hot tungsten wire at an argon pressure of 1 MPa. After initiation, the chemical reaction rapidly (~5 cm/s) propagates through the mixture in the form of a glowing combustion wave with a maximum temperature of ~2500 K. However, such conditions favor formation of graphite (not graphene) and lead to low SiC conversion (FIG. 3a).

To reduce the combustion temperature, we diluted the mixture with sodium chloride (NaCl), which acts as an inert additive during combustion reactions. As a result of the salt dilution, the maximum combustion temperature of the 24% SiC+46% PTFE+30% NaCl and 17% SiC+33% PTFE+50% NaCl (wt. %) mixtures are 1740 and 1420 K, respectively. The combustion wave propagates much slower in salt-diluted mixtures. These conditions greatly enhance the carbide reduction to carbon (FIG. 3b,c) and only traces of silicon carbide were found in water purified product of the 17% SiC+33% PTFE+50% NaCl mixture (FIG. 3c). A broad diffraction peak at ~13° is attributed to amorphous disordered carbon formed from SiC reduction (FIG. 3a-c). It is important to emphasize that the elemental analysis of carbon in the solid product, obtained under such optimized combustion conditions, shows that the carbon yield is close to 100%. Carbon yield is defined as a ratio between the amount of carbon in the solid combustion product to the initial amount of carbon in the reactive mixture.

Figure 8:
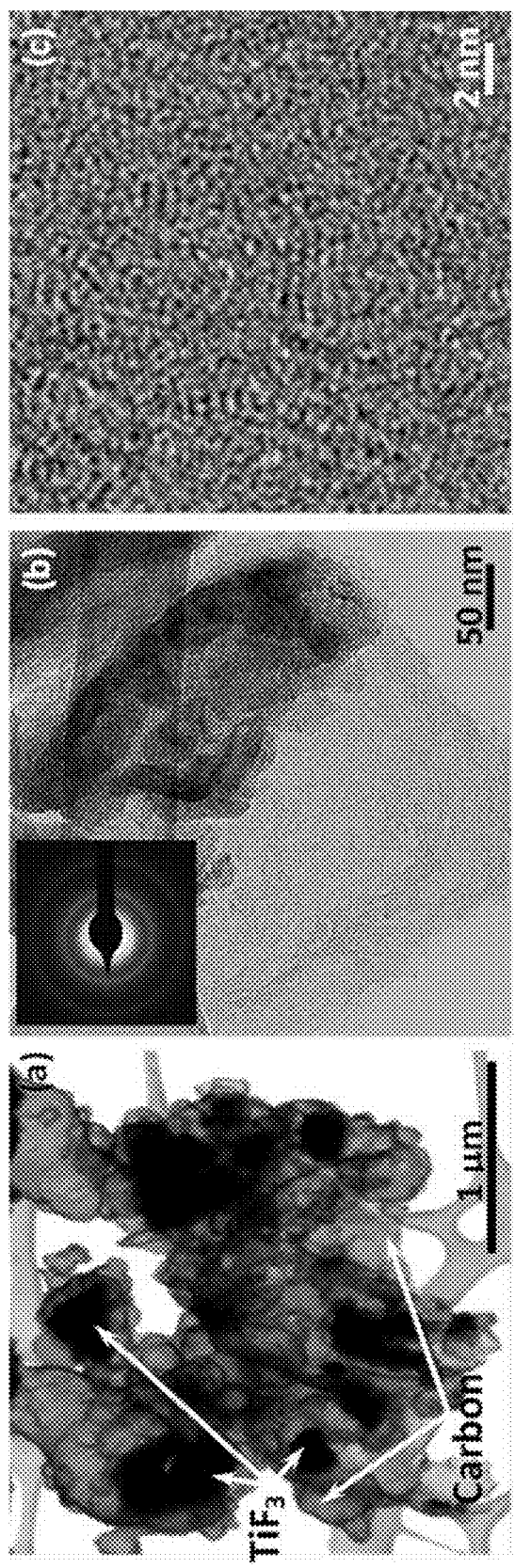
FIG. 8. Results of TEM analysis of product for 45% TiN+55% PTFE mixture: (a) the microstructure of a transparent carbon aggregate with TiF$_3$ particles, (b) carbon sheet and SAD patterns taken from it, and (c) high resolution images taken from the carbon sheet.

The experiments for thermodynamically optimized 45% TiN+55% PTFE mixture show that the maximum combustion temperature is ~1550 K (P=1 MPa). As compared to the SiC+PTFE system, no NaCl addition is needed for full reduction of the nitride. The XRD analysis data indicates that the initial TiN is fully reduced. However, a titanium fluoride (TiF$_3$) phase is detected (FIG. 3c) in this reaction system. Carbon formed during this reaction is amorphous (see FIG. 8) and may not be detected by XRD analysis. Titanium fluoride has high melting (1473 K) and boiling (1673 K) points and, thus it quickly condenses upon cooling of the samples. Additionally, TiF$_3$ is weakly soluble in water and may not be readily washed out of the product.

Accordingly, a self-sustained combustion reactions can be accomplished in both SiC+PTFE and TiN+PTFE systems, and conditions for essentially complete reduction of SiC and TiN were determined. The CS products were investigated as described herein to define the characteristic phases and morphologies of these materials.

Microstructure of the Products.

Figure 4:
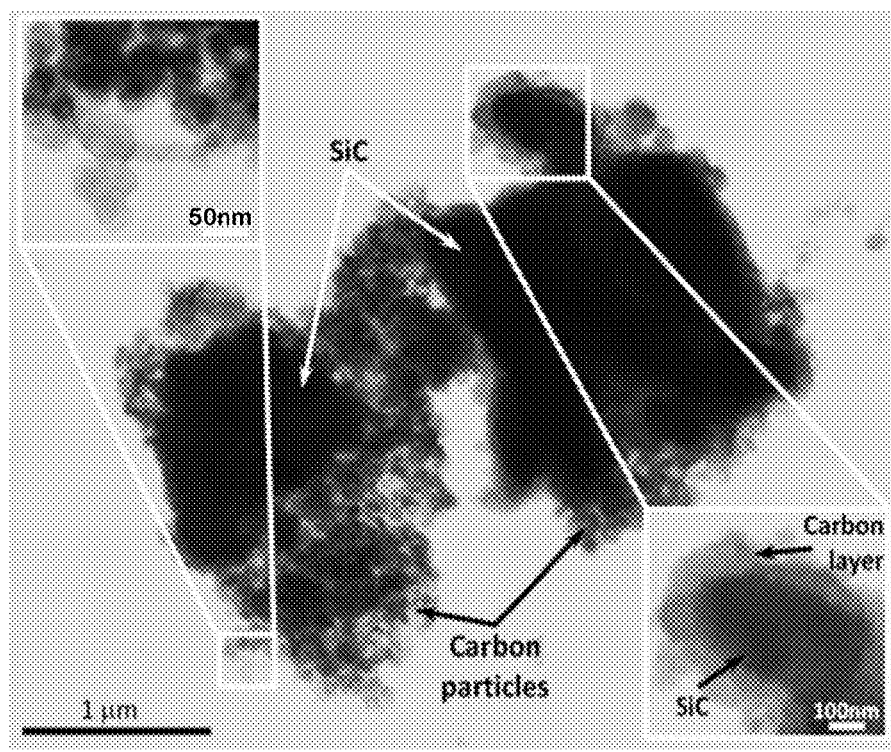
FIG. 4. Results of STEM analysis of combustion product for 35% SiC+65% PTFE mixture.

The STEM image of typical particles obtained from 35% SiC+65% PTFE mixture is shown FIG. 4. A layer of carbon with 50-100 nm thickness is clearly seen on the surface of non-reduced SiC particles (FIG. 4, insert in low right corner). This mixture also forms carbon nanoparticles with size of 30-70 nm (FIG. 4, high left corner). These carbon nanoparticles contain ~5 wt. % fluorine, which indicates that they are primarily formed by pyrolysis of PTFE. The fluorine can be part of various fluorocarbons present in the composition.

Figure 5:
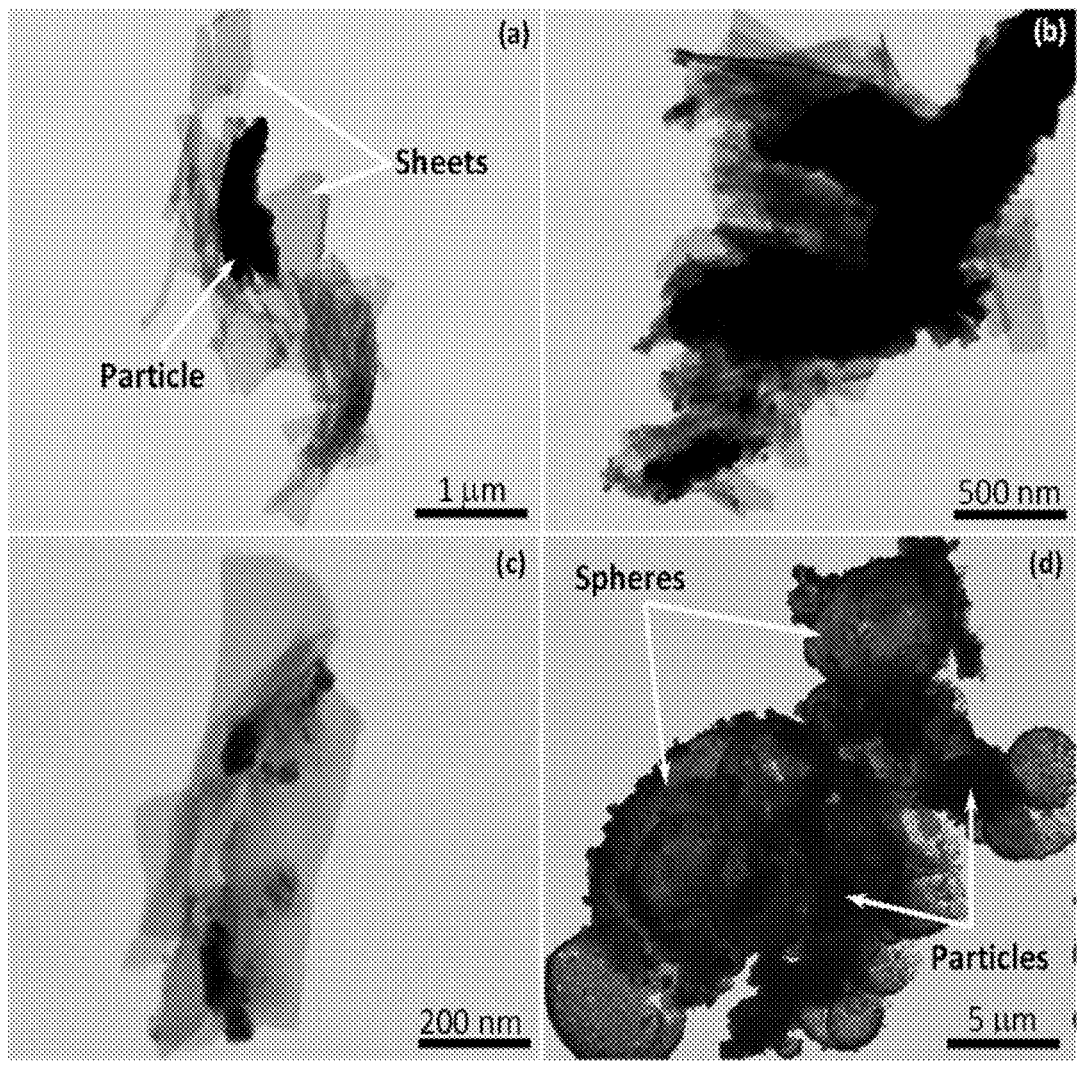
FIG. 5. Microstructure of water purified product of the 17% SiC+33% PTFE+50% NaCl initial mixture: (a-c) sheets and (d) spheres attached to particles.
Figure 6:
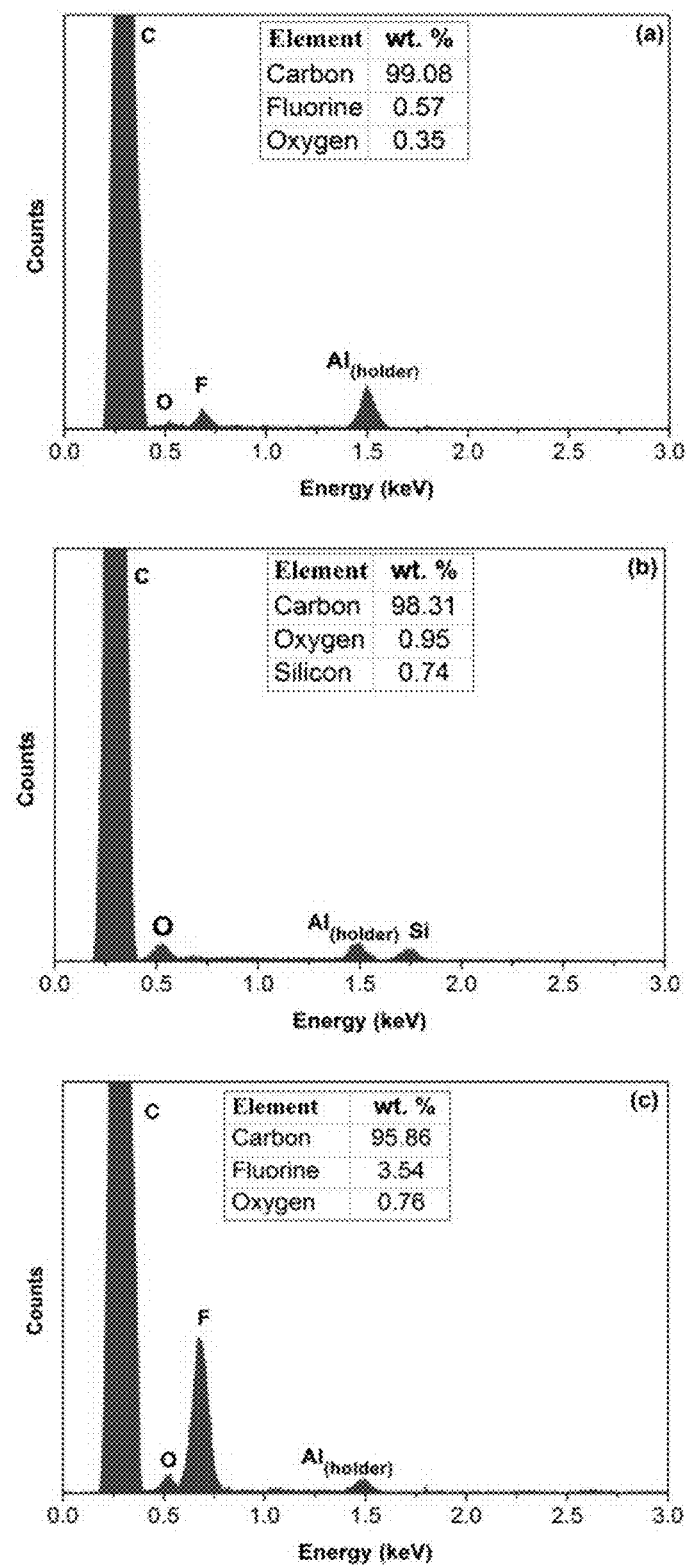
FIG. 6. Results of EDS analysis for product of the 17% SiC+33% PTFE+50% NaCl initial mixture: (a) sheets, (b) particles and (c) spheres.

The typical product synthesized from 17% SiC+33% PTFE+50% NaCl mixture consists of relatively large (a few microns in size) thin sheets attached on particles (FIG. 5a-c). Some large (up to 10 μm) transparent spheres with surface particles are also found (FIG. 5d). EDS analysis revealed that the sheets, spheres and particles contain carbon with some small impurities of oxygen, fluorine and silicon (FIG. 6). It is interesting that both sheets (FIG. 6a) and spheres (FIG. 6c) contain fluoride, and that the fluoride content in spheres is significantly higher compared to the sheets. The particles show some silicon impurities (FIG. 6b). These results clearly indicate that sheets and spheres were formed from PTFE or its decomposition products, while SiC is the source of carbon particles. The EDS analysis also showed some minute amounts of oxygen in all of these morphologies because initial reactants have small amounts of oxygen-containing impurities.

Figure 7:
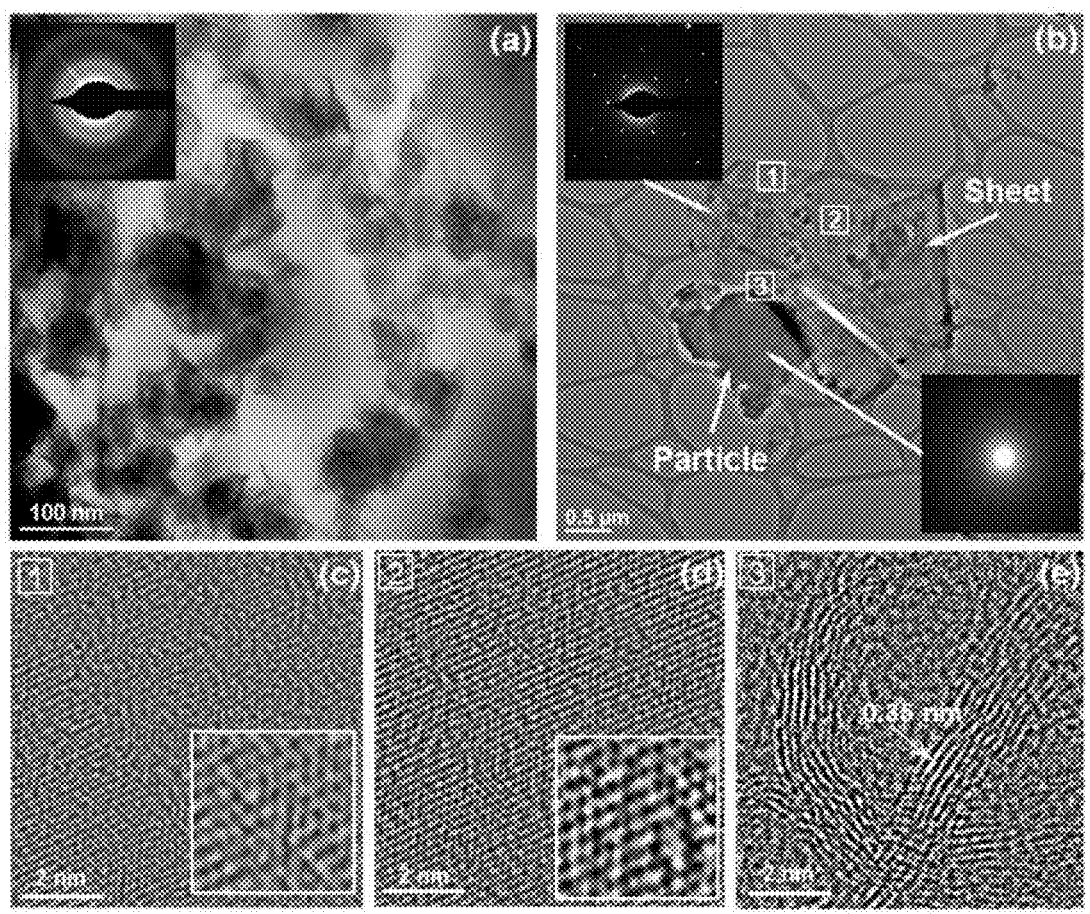
FIG. 7. Results of TEM analysis of product for 17% SiC+33% PTFE+50% NaCl initial mixture: (a) the microstructure of a carbon sphere with SAD pattern, (b) a sheet-containing particle with SAD patterns of sheets and particle, high resolution images taken from (c) edges, (d) center of sheets, as well as (e) folded graphene layers on the surface of particles.

FIG. 7 summarizes the results of TEM analysis for spheres, particles and sheets. A bright field (BF) image of the surface of a sphere is showed in FIG. 7a. The selected area diffraction (SAD) pattern (FIG. 7a, top left corner) indicates that these spherical structures are amorphous. The BF image of sheet-containing aggregates is presented in FIG. 7b. The SAD pattern (FIG. 7b, lower right corner) for bulk particles shows bright rings, indicating a disordered carbon structure, while the sheets exhibit distinctive hexagonal crystalline structures (FIG. 7b, SAD pattern in the upper left corner). The High Resolution TEM (HRTEM) images clearly show that sheets appear to be single (FIG. 7c) or few-layered (FIG. 7d) graphene. In addition, HRTEM analysis reveals that the surfaces of particles associated with flakes are covered with few-layered folded graphene (FIG. 7e).

Both STEM/TEM analysis of the product for 45% TiN+ 55% PTFE mixture primarily show transparent carbon aggregates (FIG. 8a) and sheets (FIG. 8b). The sizes (1-2 μm) of those aggregates are relatively small as compared to the spheres. Irregular TiF$_3$ particles with sizes of 0.2-0.5 μm are also seen on the surface of the carbon aggregates. The amount of carbon sheets in the product of TiN+PTFE mixture is significantly smaller as compared to SiC+PTFE system. The SAD pattern (insert in FIG. 8b) and HRTEM image (FIG. 8c) confirm that carbon sheets are amorphous.

Figure 9:
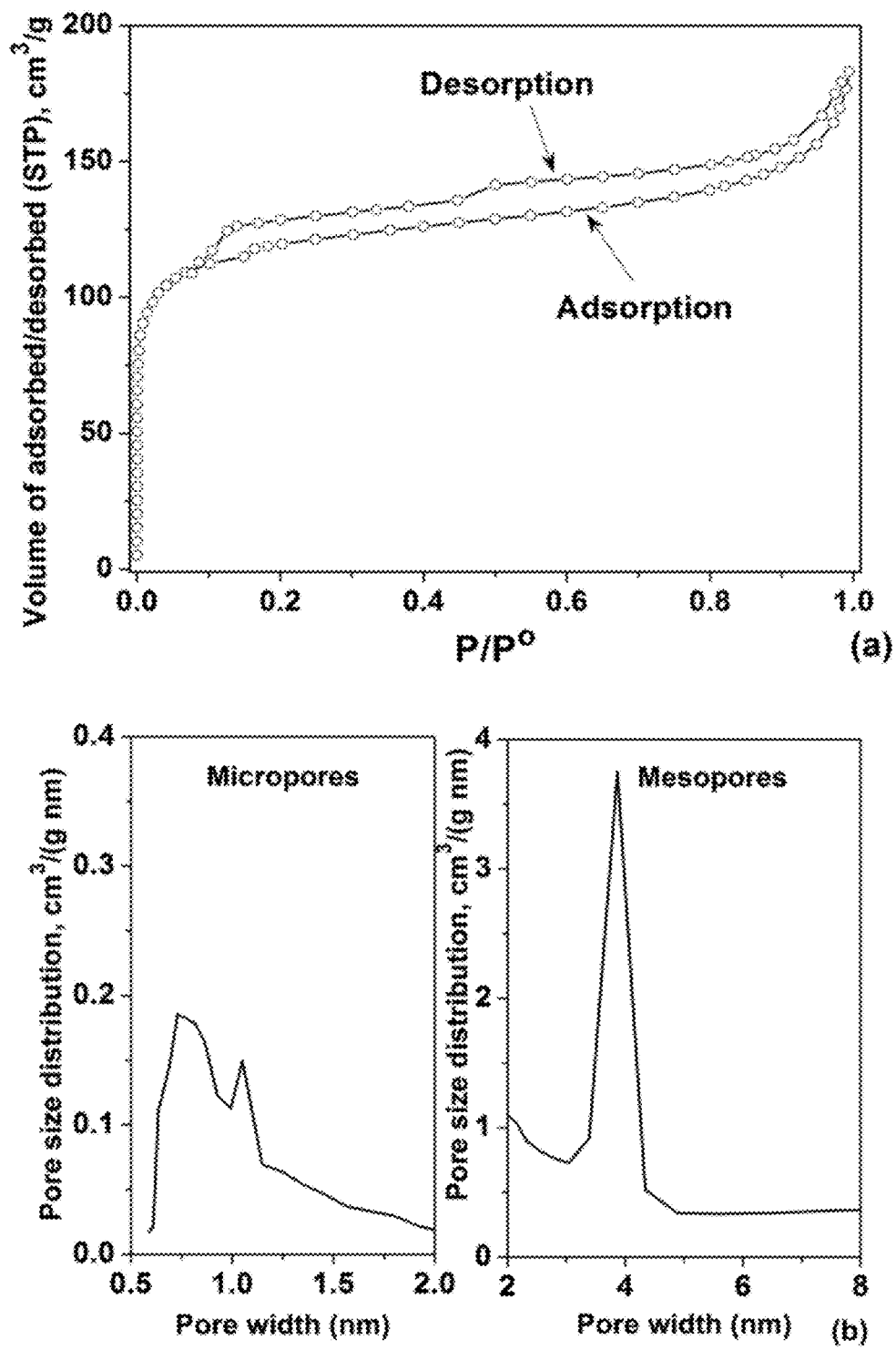
FIG. 9. The results of (a) adsorption-desorption isotherm and (b) pore size distribution of product for 17% SiC+33% PTFE+50% NaCl initial mixture.

The specific surface area (SA) of the combustion product for the 35% SiC+65% PTFE mixture is about 25 m$^2$/g, whereas the SA of the initial reactants is about 1-2 m$^2$/g. The product of the 17% SiC+33% PTFE+50% NaCl mixture has SA of about 430 m$^2$/g. This significant difference is related to the formation of pores during the reaction owing to the "extracting" of silicon from the SiC lattice. The nitrogen adsorption-desorption isotherm of the product (FIG. 9a) exhibits a hysteresis loop, indicating the presence of mesopores (pores>2 nm). The pore size distribution of the product (FIG. 9b) reveals a large portion of pores with sizes of ~3.5 nm. Some quantity of micropores (<2 nm), with sizes in the range 0.60 to 1.1 nm, is also detected. The SA of product for the 45% TiN+55% PTFE mixture is ~15 m$^2$/g.

The data discussed above shows that microstructure and phase composition of combustion products are strongly dependent on the type of used system to prepare the products. Particularly, the reaction of silicon carbide with PTFE results in formation of hybrid structures of highly porous carbon with well-crystallized graphene sheets, while reduction of titanium nitride leads to the formation of less porous amorphous carbon aggregates.

Raman Spectroscopy.

Figure 10:
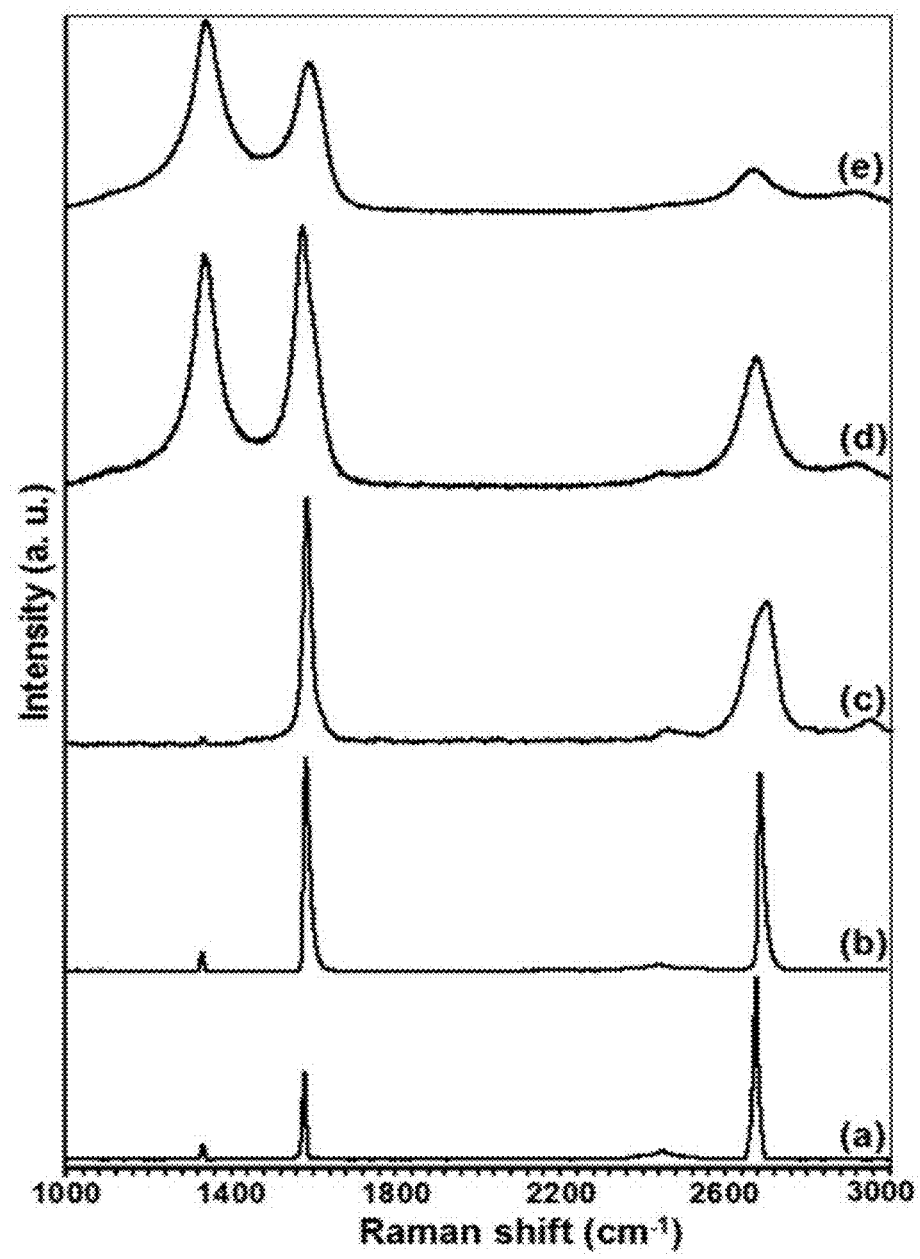
FIG. 10. Results of Raman spectroscopy for combustion product for 17% SiC+33% PTFE+50% NaCl initial mixture: (a-c) carbon sheets, (d) particles and (e) spheres.

Raman spectroscopy was also used to characterize different carbon structures in combustion product of the 17% SiC+33% PTFE+50% NaCl mixture (FIG. 10). Three types of Raman spectra are recorded for the carbon sheet. The first spectra is typical for single layer graphene, i.e. a ~0.5 G-to-2D intensity ratio with a symmetric 2D band centered at 2670 cm$^{-1}$ and a width at half maximum of 25 cm$^{-1}$ (FIG. 10a). The second type shows nearly equal intensities of the G and 2D bands (FIG. 10b), which is more typical for a bilayer graphene (see Li et al., *Science* 2009; 324(5932): 1312-1314). Both types of spectra also exhibit a less intense band at ~1330 cm$^{-1}$, indicating the presence of some disordered carbon material. The third type of Raman spectra represents a multi-layer graphene and is characterized by the lower intensity of the 2D band (FIG. 10c). Statistical analysis of the spectra shows the following structural composition of flakes: 5% single layer graphene, 65% bilayer graphene and 30% of multilayer graphene. The Raman spectra taken from the carbon particles and spheres are also presented in FIG. 9d and FIG. 9e, respectively. Those spectra include low (2670 cm$^{-1}$) and high (1330 cm$^{-1}$) intensity bands, suggesting that amorphous carbon structure is dominant. The Raman spectra of product for 45% TiN+55% PTFE mixture exhibit a very intense 1330 cm$^{-1}$ band, indicating disordered carbon.

Reaction Pathways.

We also apply combined DSC/TG and in situ gas analysis (mass-spectroscopy) of reactive mixtures to define possible reaction pathways that may occur during combustion synthesis of graphene. The results of DSC experiments for the 17% SiC+33% PTFE+50% NaCl mixture (FIG. 11) indicate two endothermic processes, corresponding to PTFE and NaCl melting at ~600 and 1070 K, respectively (Curve 1). An intensive exothermic effect observed at T~835 K is attributed to the reaction of SiC with decomposition product (s) of PTFE at 835 K. The TG curve (Curve 2) shows that the weight of the sample starts to decrease at T~730 K. This value corresponds to the onset temperature of the reaction, which is confirmed by simultaneous detection of C$_2$F$_4$ and SiF$_4$ gases (Curves 3 and 4). Similar DSC/TG experiment indicates that pure PTFE is mainly decomposed into C$_2$F$_4$ gas in the range 730-900 K. Analysis of the thermo-gravimetric curve of pure PTFE shows relatively low decomposition rates (maximum of ~9·10$^{-5}$ g/s). However, these rates are enough to decompose 3-5 μm size molten PTFE aggregates within milliseconds (typical time-scale for combustion synthesis reactions). The DSC data indicate that exothermic reaction of solid TiN with molten PTFE starts at ~730 K. The only gas product detected during in situ gas analysis of this reaction was $C_2F_4$. These results indicate that regardless of the type of ceramics used as reagent, the onset temperatures of exothermic reactions are ~730 K, which correlates with decomposition temperature of PTFE.

Figure 11:
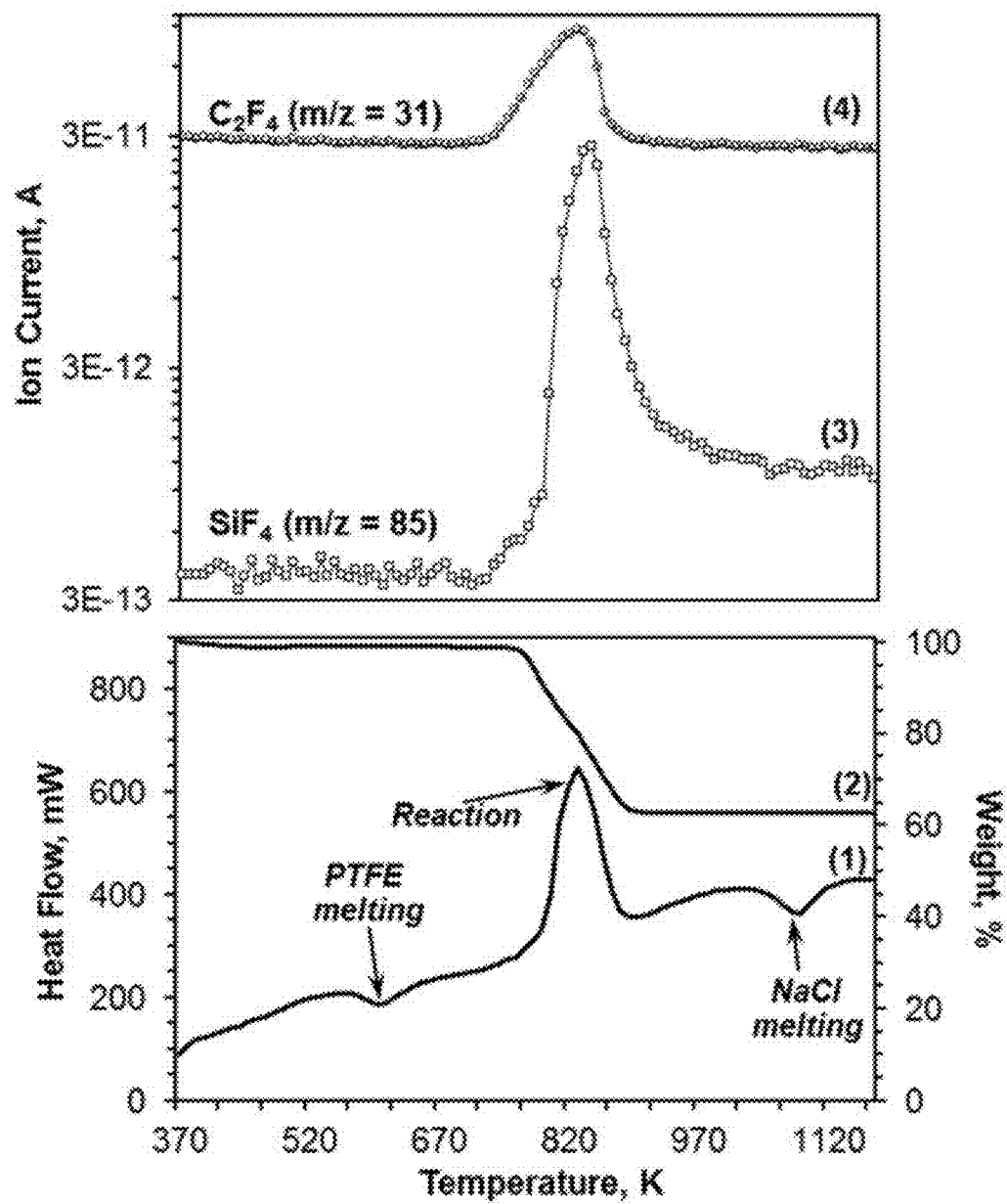
FIG. 11. Results of in-situ differential thermal (curve 1), thermo-gravimetric (curve 2) and gas analysis (curves 3 and 4) data for 17% SiC+33% PTFE+50% NaCl mixture.
Figure 12:
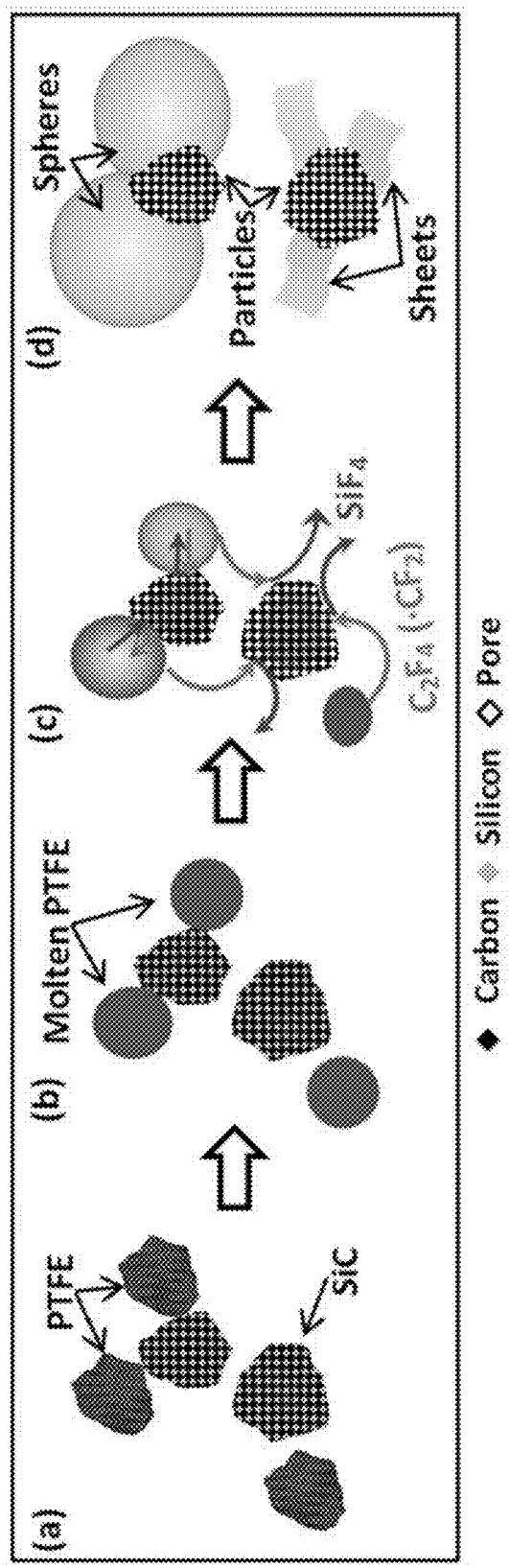
FIG. 12. The reaction pathway for SiC+PTFE system: (a) initial mixture, (b) melting of PTFE, (c) decomposition of PTFE and reaction of $C_2F_4$ with SiC and (d) final product.

Based on experimental data discussed above, the pathway of events that take place during the combustion of the SiC+PTFE mixture is consistent with the schematic shown in FIG. 12. The result of DSC experiments (FIG. 11) shows that PTFE melts at ~600 K. The viscosity of PTFE melt at 600-720 K is in the range of $10^9$-$10^4$ Pa·s. Thus, with such high viscosity, PTFE drops will not have enough time to coalesce at rapid heating conditions (~$10^3$ K/s). In the next molten polymer, drops start to decompose at ~730 K. Difluorocarbine radicals (.$CF_2$) are the primary PTFE thermal decomposition product, which rapidly recombine to form $C_2F_4$. Our experiments on gas analysis also show formation of $C_2F_4$ (FIG. 11). Simultaneously the exothermic reaction between gas phase fluorocarbons and SiC particles also starts at about 730 K by following scheme:

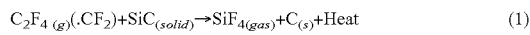

$$C_2F_4{}_{(g)}(.CF_2)+SiC_{(solid)} \rightarrow SiF_{4(gas)}+C_{(s)}+\text{Heat} \qquad (1)$$

This reaction is confirmed by observation of $SiF_4$ in gas phase (FIG. 11) and it is the driving force of self-sustained combustion. The realized $SiF_4$ expands a portion of the molten polymer (FIG. 12c), which simultaneously de-fluorinates, forming carbon spheres (FIG. 5d). Similar morphology was previously reported in the reaction of PTFE de-fluorination (Wang et al., Green Chem. 2005; 7(10):733-736). The gas molecules reacting with SiC particles "leach" Si atoms, transferring Si to the gas phase ($SiF_4$) and forming highly porous carbon (disordered) particles (FIG. 5a-c) with folded graphene layers (FIG. 6e).

Folded "native" graphene layers on porous carbon particles can have an important role can be responsible for the nucleation and growth of free-standing graphene sheets. The formation of amorphous carbon sheets in TiN+PTFE reactions, where porous carbon particles cannot be formed, indirectly confirm this statement. Evidently, in situ formation of "native" graphene layers on porous carbon, continuous supply of gas phase fluorocarbons ($C_2F_4$ and .$CF_2$) and high reaction temperatures (~1400 K) facilitate nucleation and growth of free-standing graphene sheets during the combustion process.

The methods described herein for the synthesis of graphene and carbonous materials do not require any external energy source, as the reactions occur in a self-sustained synergetic manner. Low oxygen content in the reaction system allows for the synthesis of a practically oxygen-free product. The hybrid structure of graphene sheets and porous carbon particles combine the merits of the electrical properties of graphene and large specific surface areas for porous carbon, and is a desirable structure for applications including batteries, super-capacitors, and catalysis. Finally, this approach is flexible in terms of tuning the synthesis conditions, and allows easy scale-up to kilogram or multi-kilogram scales.

DEFINITIONS

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as Hawley's Condensed Chemical Dictionary 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrase "one or more" is readily understood by one of skill in the art, particularly when read in context of its usage. For example, one or more different ceramic starting materials can be used in the reactions described, thus one or more can refer to one, one or two, one to three, one to four, or one to five (e.g., selected from TaC, ZrC, TiC, or SiC).

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discuss above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, reaction components, and ranges, are for illustration only; they do not exclude other defined values or other values within defined ranges for such elements.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the molecular level, for example, to bring about a chemical reaction, or a physical change, e.g., in a solution or in a reaction mixture.

An "effective amount" refers to an amount effective to bring about a recited effect, such as an amount (of reactants, heat, etc.) necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

A "combustion synthesis reaction" is an exothermic reaction that once initiated, is self-sustaining (i.e., self-propagating) and leads to formation of useful materials. The reaction proceeds in the manner of a combustion wave that propagates through an initial reactive media and provides products, typically carbonous products and gaseous by-products, as described herein.

A "carbonous nanomaterial" is a nanomaterial that is any form (amorphous or crystalline) of nanostructured (nanoparticles, nanotubes, nano-flakes) carbon materials.

A "refractory ceramic compound" refers to an inorganic, non-metallic material that has predominantly ionic and covalent bonding and which retains its properties at high temperatures. The ceramic compounds used and described herein (carbides, nitrides, etc.) are generally nonoxide ceramics.

The term "reactive mixture" refers to the combination of a refractory ceramic compound and a halogen containing carbon polymer or organic compound, which can react under appropriate conditions to produce graphene and other carbonous nanomaterials via combustion synthesis.

As used herein, "substantially oxygen-free" means that the oxygen gas in a system has been removed, for example, by evacuation followed by replacing the previous atmosphere with a non-oxygen gas, typically an inert gas (nitrogen or argon). The purge cycle can be repeated one or more times (typically three) to obtain an atmosphere with less than about 0.01 mol % oxygen, often less than about 0.001 mol % oxygen.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1

Synthesis of Carbon-Based Nano-Structures

Thermodynamic Calculations.

Thermodynamic calculations for reactions between PTFE and refractory materials such as carbides (TaC, ZrC, TiC, SiC), nitrides (TaN, ZrN, TiN), as well as borides (TaB$_2$, ZrB$_2$, TiB$_2$) were performed using THERMO software (Shiryaev, *Int. J. SHS* 1995; 4:351-362). The adiabatic combustion temperature ($T_{ad}$) and equilibrium products were calculated as a function of the initial mixture composition, which can also include sodium chloride or a similar non-reactive salt, and inert gas (e.g., argon) pressure in the chemical reactor. Based on the thermodynamic calculations the systems were selected for the further experimental studies.

Synthesis.

Combustion synthesis (CS) experiments were performed under optimal parameters determined by thermodynamic calculation. In a typical experiment, ceramic powders (i.e., SiC or TiN) with the particle size being less than about 45 μm and polytetrafluoroethylene (particle size 3-5 μm) purchased from Alfa Aesar were used as the reagents. Sodium chloride was used to control the reaction temperature. Ceramic powders and an appropriate quantity of sodium chloride (e.g., about 0.1 to about 3 times the mass of ceramic powder) were milled together for 20 minutes in a 99.9998% pure argon atmosphere using a Retsch PM100 ball mill in a stabilized zirconia jar (500 mL) with zirconia balls (3 mm in diameter). The ball to mixture ratio was 10:1. The rotational speed was about 650 rpm. After milling, PTFE powder was added to the jar and a subsequent mixing of reactants was performed for 2 hours at a speed of about 100 rpm.

The reactive mixture prepared as described above was placed in a quartz beaker of 20 mm in diameter and 35 mm height. The beaker was then inserted into a high-pressure stainless steel reactor equipped with a sapphire window to follow the combustion reaction, similar to the reactor described by Manukyan and coworkers (*Chem. Eng. J.* 2008; 143(1-3):331-336). Before reaction initiation, the reactor was evacuated, and purged with 99.9998% pure argon for three cycles and finally filled with argon to desired pressure (typically about 1 MPa).

The reaction was initiated by the local (~1 mm³) preheating of the mixture by a resistivity heated tungsten wire. After initiation, the chemical reaction propagates through the sample in the form of a rapidly moving combustion wave. The temperature-time history of the synthesis process was recorded by 100 μm C-type thermocouples inserted inside the reactive mixture. To ensure the stability of measurements, the thermocouples were coated by a thin layer of boron nitride. The output signal of thermocouple was transformed by a data acquisition system and recorded with 1 kHz frequency. The maximum combustion temperature was calculated as the average of maximums for two temperature profiles. The velocity of combustion wave propagation was measured by frames of video recording of combustion process (Hwang, Mukasyan, and Varma, *Combust. Flame* 1998; 115(3):354-363).

After complete cooling, the reactor was vented and the gas inside the vessel was slowly passed through a column (1 m long) of concentrated sodium hydroxide solution to capture the fluoride gases released. Sodium chloride containing products were washed away by water until absence of chlorine ions as determined by silver ions.

A thermo-gravimetric analyzer and differential scanning calorimeter (DSC/TG, Metter-Toledo) coupled with a mass spectrometer (Pfeiffer Vacuum) were also used to follow the reaction pathways. In these experiments, 0.03 g of the reactive mixture was heated to 1270 K at a 100 K/min heating rate in an atmosphere of 99.9998% pure argon with a flow rate of 80 cm³/min. The recording rate for evolved gases was 10 data points per second.

Materials Characterization.

The phase compositions of the combustion products were determined by X-ray diffraction (XRD) analysis with Ni-filtered CuKα radiation (D8 Advance, Bruker) operated at 40 kV and 40 mA. Step-scan with size of 0.025° and counting time up to 3 s were recorded for the angular range 10-80° (2θ).

The scanning electron microscopy (SEM) and transmission electron microscopy (TEM) were employed to characterize the composition and morphology of the reaction products, as well as the atomic structure of the materials. The SEM analysis was conducted by Magellan 400 (FEI), which was equipped with a scanning transmission electron microscopy (STEM) detector allowing imaging in transmission at nm-level (with resolution about 1 nm) and a Bruker energy dispersive x-ray spectrometer (EDS). A Titan 80-300 (FEI) electron microscope with a resolution of 0.136 nm in STEM mode and about 0.1 nm information limit in HRTEM modes was also used. The Titan electron microscope was equipped with Energy Dispersive X-ray Spectroscopy (EDS, Oxford Inca) and electron energy loss spectroscopy (EELS, Gatan) systems with spectral energy resolution of 130 eV and 0.8 eV, respectively.

Measurements of specific surface area and pore size distribution of product gas adsorption/desorption analysis, with nitrogen (~77 K) as adsorbate, was performed using an ASAP 2020 (Micromeritics) analyzer. Before absorption analysis, the samples were dried at 395 K for 3 hours and then vacuum outgassed at 570 K for 12 hours. The Brunauer-Emmet-Teller (BET) equation was used to calculate specific surface area. Pore size distributions and pore volumes were determined by Barrett-Joiner-Halenda and Horvath-Kawazoe methods.

The Raman spectroscopy (NRS-5100, Jasco Analytical Instruments) of materials was performed using green (532 nm) laser excitation. Scans were taken on an extended range (100-3500 cm¹) and the exposure time was 20 s for five accumulations. The sample was sonicated in ethanol and drops were applied to a glass slide for observation. The sample was viewed using a maximum magnification of ×100.

Example 2

General Process to Prepare and Isolate Graphene Materials

Step A.

Preparation of the initial reaction mixture. Desired amounts of ceramic and polymer powders (typically a ratio of about 2:1 to about 1:5 of ceramics:polymer) in the form of fine powders (approximately 0.5-10 μm particle size) are thoroughly mixed for several hours. For example, an effective molar ratio of ceramic:polymer in the SiC+polytetrafluoroethylene system is 1:0.75. In addition to reactants, some amount of sodium chloride (about 20 wt. % to about 70 wt. % of initial mixture) is added to the reactant to control the combustion temperature of the process. The salt is an inert additive, which decreases the reaction temperature and can be easily removed from solid product by washing the products. Prior to mixing, the components can be dried at approximately 100° C. for several hours and then weighed to appropriate amounts. Mixing of the reactants may be performed by any suitable and effective method, such as a ball mill. Two hours of mixing time is typically sufficient for effectively combining the reactants. A ceramic jar and balls with sizes less than about 1 cm may be used for mixing. A 5:1 ball to powder ratio may be used.

Step B.

Combustion Synthesis. The initial reactive mixture (ceramic, polymer, and optionally salt) is loaded in a sealable high pressure reaction chamber. A tungsten wire (or multiple wires) is positioned about 5 mm inside the reaction mixture. The chamber is then sealed, evacuated, and purged with inert gas, e.g., argon. The chamber is then typically filled with inert gas argon to a pressure of about 0.5 to about 2.0 MPa. A small initial volume (about 1 mm³) of the homogeneous reactive mixture is then heated by means of a tungsten-wire igniter system until the reaction is initiated locally, followed by turning off the igniter power, while the reaction front propagates through the mixture to form the graphene and/or carbon nano-structures. After cooling, the reactor is venting and gas is passing through the sodium hydroxide solution. This operation allows complete capture of fluoride gases formed during the process.

Step C.

A third step is an optional post-reaction processing of the synthesized powder. A simple water treatment operation allows for removal of the sodium chloride additive from the products. For example, during a washing process, 100 grams of product was stirred in 500 mL of deionized water for 1 hour. The carbon materials were then separated from the resulting salt solution by vacuum filtration.

The graphene material can also be separated from any amorphous carbon. In this process, a sort-term (e.g., 0.5 hour) sonication of the product powder in a water solution containing 5% of ethyl alcohol and 0.2% of isopropyl-alcohol allows for the selectively separation of the amorphous carbon by-product from the graphene material, where the amorphous carbon materials precipitate from the mixture, minor amounts of hydrophobic impurities form a film on top of the mixture, and graphene forms an aqueous colloid. Followed by removal of the film of hydrophobic by-products on the top of solution, the graphene colloid can be separated from amorphous products by simple decantation. The graphene can then be isolated from by vacuum filtration.

Example 3

Combustion Synthesis of Graphene and Carbonous Particles

Step A.

Preparation of the initial reaction mixture. A mixture of 8.5 grams of silicon carbide (Alfa Aesar, average particle size ~5 μm) and 25 gram of sodium chloride (Alfa Aesar, particle size ~50 μm) was milled in a stabilized zirconium oxide jar for 30 minutes. Zirconium oxide balls (5 mm in diameter) were used in the milling process. The ball to powder mass ratio was 5:1. The milling speed was 650 rpm. Afterward, the milling jar was opened and 17.5 grams of PTFE powder was added followed by additional mixing with rotation speed of 100 rpm for 1.5 hours.

Step B.

Combustion Synthesis. The as-prepared reactive mixture was separated from the milling balls by sieving and were loaded into a ceramic boat, which was then transferred to a high pressure reaction chamber (volume of 5 litters). A tungsten wire was positioned about 5 mm inside the reaction mixture. The chamber was sealed, evacuated, and purged with an inert gas (argon). The chamber was then filled with the inert gas to a pressure of 1.0 MPa. A small (about 1 mm$^3$) volume of the homogeneous reactive mixture was heated by means of a tungsten-wire by passing short (3 s) impulse of electrical current. After the reaction was initiated the ignition power was turned off and the reaction front propagated through the mixture to form the graphene and carbon nano-structures. After completion of the reaction, the product was allowed to cool to room temperature, followed by venting the chamber with an inert gas, which was passing through a sodium hydroxide solution at the entrance.

Step C.

Post-reaction processing of the synthesized powder was carried out as described above in Example 2.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A method for forming free-standing graphene sheets comprising initiating a self-sustaining exothermic combustion synthesis reaction between a refractory ceramic compound and a halogen-containing carbon substrate, wherein combustion proceeds under a substantially oxygen-free inert atmosphere at about 0.25 MPa to about 20 MPa, wherein after ignition the reaction is exothermic and self-propagating, and the reaction results in the formation of reduced carbon materials, wherein the reduced carbon materials comprise free-standing graphene sheets substantially void of impurities.

2. The method of claim 1 wherein the refractory ceramic compound is a carbide, boride, nitride, or hydride.

3. The method of claim 2 wherein the refractory ceramic compound is SiC, $Si_3N_4$, AlN, $B_4C$, $Mo_2C$, TiC, TiN, $TiB_2$, $TiH_2$, $Ti_3SiC_2$, TaC, TaN, $TaB_2$, WC, ZrC, ZrN, $ZrB_2$, or $ZrH_2$.

4. The method of claim 1 wherein the halogen-containing carbon substrate is selected from polytetrafluoroethylene (PTFE), polyvinyl chloride (PVC), polyvinyl fluoride (PVF) polyethylenechlorotrifluoroethylene, poly(vinylidene fluoride), polytetrafluoroethylene, polyvinyl chloride, polyvinyl fluoride, polyethylenechlorotrifluoro-ethylene, or poly(vinylidene fluoride), poly(vinylidene chloride), fluorinated ethylene propylene, poly(4-bromostyrene), poly(4-chlorostyrene), poly(2-chloro-1,3-butadiene), brominated polystyrene, chlorinated polystyrene, or poly(tetrafluoroethylene propylene).

5. The method of claim 1 wherein the refractory ceramic compound and the halogen-containing carbon substrate are in the form of micronized powders that are mixed together to form a reactive mixture.

6. The method of claim 1 wherein the reduced carbon materials further comprise graphene-amorphous carbon composites and microporous carbon particles.

7. The method of claim 1 wherein the reduced carbon materials formed by the method comprise graphene sheets, wherein the graphene sheets are about 1 μm to about 10 μm in width, and about 1 μm to about 10 μm in length, and about 1 to about 10 Angstroms thick.

8. The method of claim 1 wherein the ratio of the refractory ceramic compound and the halogen-containing carbon substrate is about 1:1 to about 1:3.

9. The method of claim 1 wherein the free-standing graphene sheets comprise less than 1 wt. % of impurities.

10. The method of claim 9 wherein the reduced carbon materials comprise less than 1 wt. % of oxygen.

11. A method comprising initiating a combustion synthesis reaction between silicon carbide (SiC) and polytetrafluoroethylene (PTFE) under a substantially oxygen-free inert atmosphere at about 0.25 MPa to about 20 MPa, wherein the silicon carbide (SiC) and the polytetrafluoroethylene (PTFE) are in the form of micronized powders that are mixed together to form an exothermic self-propagating reactive mixture, wherein the exothermic self-propagating reaction mixture further comprises a water-soluble salt that following ignition of an exothermic self-propagating reaction modulates the temperature of the exothermic self-propagating reaction, and the reaction results in the formation of reduced carbon materials, wherein the reduced carbon materials comprise graphene in combination with carbon mesoporous particles, or thin-walled carbon spheres, wherein the graphene comprises sheets that are about 1 μm to about 10 μm in width, about 1 μm to about 10 μm in length, and about 1 to about 10 Angstroms thick.

12. The method of claim 11 wherein the ratio of SiC to PTFE is about 1:1 to about 1:3.

13. The method of claim 11 wherein the graphene sheets comprise less than about 1 wt. % oxygen.

14. The method of claim 11 further comprising isolating graphene from other carbon structures produced in the combustion synthesis reaction.

15. The method of claim 11 further comprising preparing a thin film transistor, a storage device, a gas sensing device, or a coating from the reduced carbon materials.

16. The method of claim 11 further comprising isolating the graphene from the reduced carbon materials.

17. The method of claim 16 wherein isolating the graphene comprises sonicating the reduced carbon materials in a water solution containing about 3% to about 7% ethyl alcohol, and about 0.1% to about 0.3% isopropyl alcohol.

18. The method of claim 11 wherein the reduced carbon materials further comprise graphene-amorphous carbon composites and microporous carbon particles.

19. The method of claim 11 wherein the graphene sheets have at least 2 times to at least 25 times the surface area of the micronized powders.

20. The method of claim 11 wherein the ratio of SiC to PTFE is about 1:2.

* * * * *